United States Patent [19]
Aso et al.

[11] Patent Number: 4,711,981
[45] Date of Patent: Dec. 8, 1987

[54] COMBINED WIRE ELECTRODE ELECTRICAL DISCHARGE MACHINE AND INITIAL HOLE FORMING DEVICE

[75] Inventors: Toshiyuki Aso; Tamotu Ishibashi, both of Hino, Japan

[73] Assignee: Fanuc Ltd., Yamanashi, Japan

[21] Appl. No.: 815,090

[22] PCT Filed: Apr. 8, 1985

[86] PCT No.: PCT/JP85/00176
§ 371 Date: Dec. 3, 1985
§ 102(e) Date: Dec. 3, 1985

[87] PCT Pub. No.: WO85/04608
PCT Pub. Date: Oct. 24, 1985

[30] Foreign Application Priority Data
Apr. 7, 1984 [JP] Japan ................... 59-68378

[51] Int. Cl.⁴ ............................................. B23H 7/02
[52] U.S. Cl. ................................. 219/69 W; 219/69 R
[58] Field of Search ............. 219/69 M, 69 G, 69 W, 219/69 R; 204/206, 224 M

[56] References Cited
U.S. PATENT DOCUMENTS 3,609,279  9/1971  Giesbrecht ..................... 219/69 G
3,891,819  6/1975  Ullmann et al. ............... 219/69 W
4,387,284  6/1983  Nicholas et al. ............... 219/69 G
4,518,842  5/1985  Obara ............................. 219/69 W
4,598,189  7/1986  Inoue et al. .................... 219/69 W

FOREIGN PATENT DOCUMENTS 58-51018  3/1983  Japan ........................ 219/69 M
58-56729  4/1983  Japan ........................ 219/69 M
WO83/00453  2/1983  PCT Int'l Appl. .......... 219/69 G
856729  8/1981  U.S.S.R. .................... 219/69 M Primary Examiner—A. D. Pellinen
Assistant Examiner—Geoffrey S. Evans
Attorney, Agent, or Firm—Armstrong, Nikaido, Marmelstein & Kubovcik

[57] ABSTRACT

A wire electrode electrical discharge machine includes an initial hole forming device mounted on a frame unit attached to the vertical slider of the electrical discharge machine; the initial hole forming head is vertically movable on the frame unit and has a rotary chuck for holding a hollow bar electrode; electrical switches on the frame unit generate signals upon the detection of the initial hole forming head being position at an initial hole forming position and at a resting position in its vertical movement on the frame unit and lateral movement of the upper wire guiding unit toward the initial hole forming head is inhibited while the initial hole forming head is located at the initial hole forming position.

7 Claims, 4 Drawing Figures

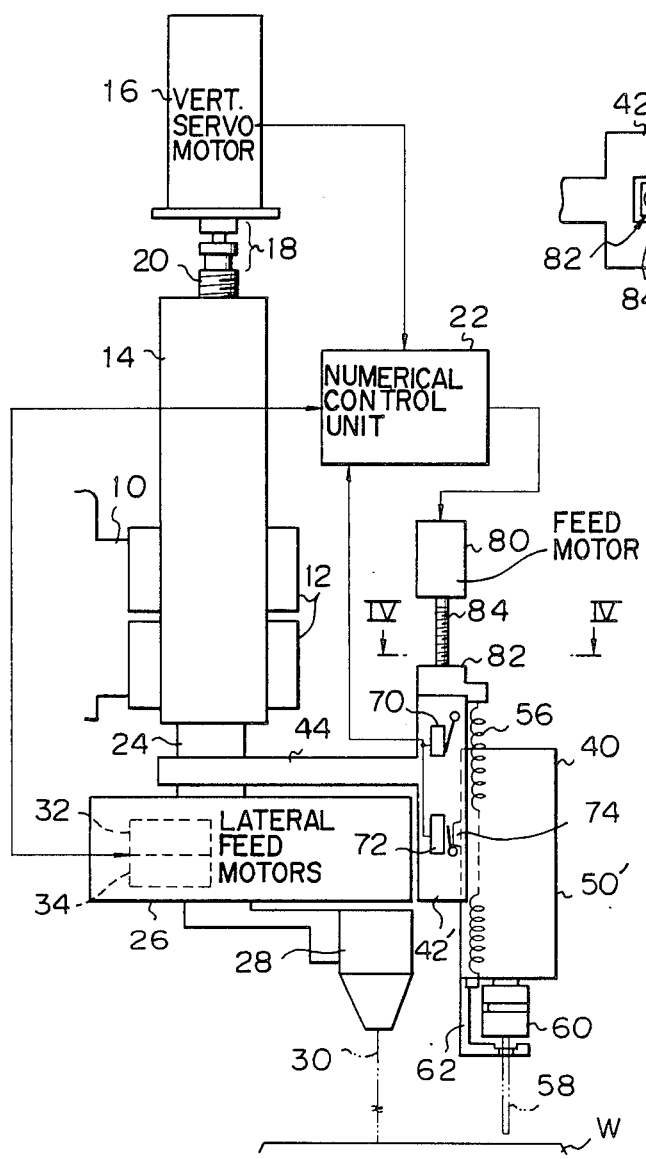
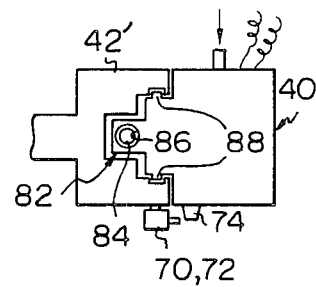
Fig. 3
Fig. 4

COMBINED WIRE ELECTRODE ELECTRICAL DISCHARGE MACHINE AND INITIAL HOLE FORMING DEVICE

TECHNICAL FIELD

The present invention relates to an initial hole forming device for forming an initial hole through a metallic workpiece to receive the wire electrode of an electrical discharge machine using a wire electrode (referred to as "wire-cut electrical discharge machine" hereinafter) and, more particularly, to an initial hole forming device adapted for disposition adjacent to the wire electrode guiding unit of a wire-cut electrical discharge machine.

BACKGROUND ART

A hole for receiving a wire electrode therethrough, namely, an initial hole, must be formed at a predetermined position on a workpiece prior to wire-cut electrical discharge machining. The initial hole must be formed at a position as near as possible to the wire guide of the wire-cut electrical discharge machine. When an initial hole is formed near a wire-cut starting position, the wire electrode can be inserted through the initial hole immediately after the initial hole has been formed, to start wire-cut electrical discharge machining.

However, the conventional initial hole forming means is disposed as far away as possible from the wire electrode guiding unit of the electrical discharge machine in order to prevent interference between the initial hole forming means and the wire electrode guiding unit. Consequently, in some cases, the wire electrode guiding unit cannot be moved relative to the workpiece to insert the wire electrode through the initial hole formed in the workpiece by the initial hole forming means. That is, inconveniently, the initial hole can be formed in the workpiece only within a particular limited area. Accordingly, it is desired to dispose an initial hole forming device adjacent to the wire guiding unit. However, when an initial hole forming device is disposed adjacent to the wire guiding unit, the wire guiding unit may interfere with the initial hole forming device in that the wire guiding unit is displaced from the normal position for forming a tapered hole or the like by the wire electrode. Therefore, such disposition of the initial hole forming device requires an appropriate interference preventing means to prevent damage to the machine.

DISCLOSURE OF THE INVENTION

Accordingly, it is an object of the present invention to provide an initial hole forming device provided with interference preventing means and capable of being disposed near the wire guiding unit of a wire-cut electrical discharge machine.

The present invention provides an initial hole forming device for an electrical discharge machine having wire guiding means for guiding a wire electrode and vertical feed means for moving the wire guiding means vertically toward and away from the workpiece, comprising: frame means attached to the vertical feed means; an initial hole forming head attached to the frame means so as to be vertically slidable relative to the frame means and provided at the lower end thereof with a rotary chuck for holding a hollow bar electrode; means for vertically shifting the initial hole forming head on the frame means between two positions, namely, an initial hole forming position near the wire guiding means and a resting position to which the initial hole forming head is retracted upward from the initial hole forming position; and position detecting means provided on the frame means and capable of detecting the arrival of the initial hole forming head at the initial hole forming position and at the resting position. In this configuration, the wire guiding means cannot be moved laterally, except when the initial hole forming unit is retracted from the working position, namely, the initial hole forming position, to the resting position, and hence interference between the initial hole forming head and the wire guiding means is prevented. Furthermore, it is also possible to interlock the initial hole forming device employing a hollow bar electrode and the electrical discharge machine by interconnecting a numerical control (NC) device, which is used for the programmed control of the machining work of the electrical discharge machine employing a wire electrode, and the position detecting means with a signal transmission line.

BRIEF DESCRIPTION OF THE DRAWINGS

FIG. 3 is a schematic view similar to FIG. 1, showing the construction of the essential portion of an electrical discharge machine equipped with an initial hole forming device, in a second embodiment according to the present invention; and FIG. 4 is a schematic plan view as seen in the direction of arrows IV and III in FIG. 3.

BEST MODE FOR CARRYING OUT THE INVENTION

Figure 2:
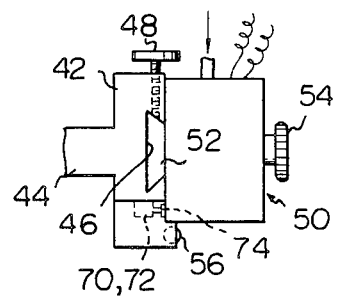
FIG. 2 is a schematic plan view as seen in the direction of arrows II in FIG. 1.
Figure 1:
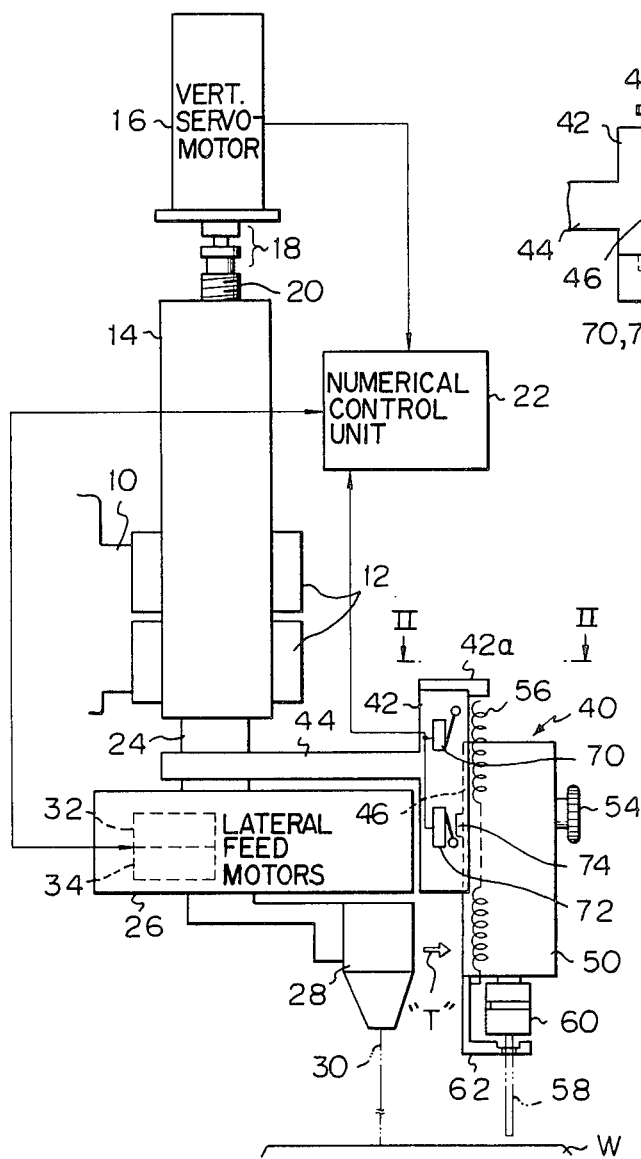
FIG. 1 is a schematic view showing the construction of the essential portion of an electrical discharge machine equipped with an initial hole forming device, in a first embodiment according to the present invention.

Referring to FIGS. 1 and 2, linear guides 12 are provided on the frame 10 of a wire-cut electrical discharge machine, and a vertical slider 14 is provided so as to be vertically slidable along the linear guides 12. A vertical feed screw 20 connected through a coupling 18 to a servomotor 16 engages the vertical slider 14 for providing a servo movement for the vertical slider 14 in vertical directions (along a Z-axis). The servomotor 16 is controllably connected to an NC unit 22 for controlling the wire-cut electrical discharge machine according to a program. An upper wire guiding unit 28 for guiding a wire electrode 30 which is incorporated into a lateral feed mechanism 26 is attached to the lower end of a support shaft 24 provided in the lower portion of the vertical slider 14. Wire-cut electrical discharge machining of a workpiece W is carried out with the wire electrode 30 movably extended between the upper wire guiding unit 28 and a lower wire guiding unit, not shown. The lateral feed mechanism 26 is a working mechanism for horizontally shifting the upper wire guiding unit 28 in directions of two perpendicularly intersecting axes within a plane perpendicular to the Z-axis. The lateral feed mechanism 26 is a well-known mechanism which is driven in the directions of the two perpendicularly intersecting axes by built-in motors 32 and 34. The motors 32 and 34 also are controllably connected to the NC unit 22. In FIG. 1, the upper wire guiding unit 28 is located at the normal wire-cut electrical discharge machining position, in which the wire electrode runs vertically between the upper wire guiding unit 28 and the lower wire guiding unit, not shown.

When the upper wire guiding unit 28 is shifted horizontally, for example, by a predetermined distance in a direction indicated by an arrow T, by the lateral feed mechanism 26, the wire electrode 30 runs along a line tilted from a vertical direction, whereby a tapered hole can be formed in the workpiece W. The vertical distance between the upper wire guiding unit 28 and the lower wire guiding unit is adjusted to an appropriate value according to the height of the workpiece W. A vertical feed means equipped with the vertical slider 14 is used for feeding the electrode of an initial hole forming device which will be described afterward.

Now, an initial hole forming device 40 embodying the present invention has a frame unit 42 having an arm 44 attached to the support shaft 24 of the vertical feed means. The frame unit 42 is disposed as near as possible to the upper wire guiding unit 28 of the wire-cut electrical discharge machine. As illustrated in FIG. 2, a dovetail sliding guide groove 46 is formed in the frame unit 42 on the foreside thereof opposite to the backside provided with the arm 44 so as to extend vertically. The sliding projection 52 of an initial hole forming head 50 is fitted vertically slidably in the sliding guide groove 46. Thus, the initial hole forming head 50 is vertically slidable relative to the frame unit 42. An operating handle 54 is provided on the foreside of the initial hole forming head 50 for raising or lowering the initial hole forming head 50 manually by hand. The initial hole forming head 50 can be fixedly located at a desired position relative to the frame unit 42 by means of a stop screw 48 with a handle (FIG. 2). A spring 56 is extended between a bracket 42a fixed to the frame unit 42 and the lower end of the initial hole forming head 50, to counterbalance the weight of the initial hole forming head 50 so that the initial hole forming head 50 can be raised by applying a small upward force to the handle 54. The initial hole forming head 50 is provided at the lower end thereof with a rotary chuck 60 for holding a hollow bar electrode 58 and a guide holder 62 for guiding the bar electrode 58 straight and for supplying a machining liquid when forming an initial hole. The initial hole forming head 50 is equipped internally with a bar electrode rotating mechanism, a discharge power supply unit, and a machining liquid supply unit. Such a device is disclosed in greater detail in applicants copending U.S. patent application Ser. No. 795,699.

Furthermore, according to the present invention, two limit switches 70 and 72 are fixedly disposed at upper and lower positions, respectively, on the side surface of the frame unit 42. A dog 74 is provided on the backside of the initial hole forming head 50 so as to be engaged with the limit switch 70 or 72 to actuate the same or to be disengaged from the limit switch 70 or 72. When actuated, the limit switches 70 and 72 provide electric signals, respectively. When the initial hole forming head 50 is positioned at the upper resting position, the dog 74 engages the upper limit switch 70 and when the initial hole forming head 50 is positioned at the initial hole forming position, the dog 74 engages the lower limit switch 72 to actuate the latter. The dimension and configuration of the initial hole forming head 50 is designed so that, when the same is positioned at the resting position, the rotary chuck 60, the guide holder 62 and the other components thereof will not interfere with the wire guiding unit 28 even if the wire guiding unit 28 is moved horizontally in the direction of the arrow T. The initial hole forming head 50 is lowered to the initial hole forming position, then the guide holder 62 is lowered to the upper surface of the workpiece W, and then the hollow bar electrode 58 is rotated and discharge power and the machining liquid are supplied for initial hole forming operation. Then, the vertical slider 14 moves the frame unit 42 and the initial hole forming head 50 in a unit downward toward the workpiece W to feed the hollow bar electrode 58 vertically. Thus an initial hole is formed at a position near the running course of the wire electrode 30 guided by the upper wire guiding unit 28.

In the constitution and arrangement illustrated in FIGS. 1 and 2, the limit switches 70 and 72 are connected electrically to the NC unit 22 to give electric signals to the NC unit 22. The following actions can be achieved on the basis of the electric signals provided by the limit switches 70 and 72.

First, as illustrated in FIG. 1, when the limit switch 72 gives an ON-signal to the NC unit 22 upon the arrival of the initial hole forming head 50 at the initial hole forming position, the NC unit 22 provides an initial hole forming command to start rotating the electrode, supplying the machining liquid and supplying discharge power so that the initial hole forming head 50 is ready for initial hole forming operation. In this state, the wire-cut discharge machining operation of the wire-cut discharge machine by the wire electrode 30 has been stopped, and hence feeding of the wire electrode 30 is stopped.

Secondly, when the initial hole forming head 50 is raised after the completion of the initial hole forming operation and the limit switch 72 provides an OFF-signal, the NC unit 22 makes the initial hole forming command ineffective to stop the initial hole forming head 50. Then, the electrode is stopped and the supply of the machining liquid and the discharge power is stopped.

When the upper limit switch 70 provides an ON-signal upon the arrival of the initial hole forming head 50 at the resting position, the NC unit 22 gives a command to the lateral feed mechanism 26 to permit the horizontal movement, namely, the horizontal displacement from the normal position shown in FIG. 1, of the upper wire guiding unit 28 of the wire-cut discharge machine. At this time, the wire-cut electrical discharge machine is ready for operation; the same can be started for wire-cut electrical discharge machining, for example, by pushing a start button. The wire electrode 30 is inserted through the initial hole formed in the above-mentioned manner, and then the wire-cut electrical discharge machining of the workpiece W is started. At this time, all the operations of the initial hole forming head 50 are stopped, which, naturally, is continued while the limit switch 70 is providing the ON-signal.

On the other hand, when the initial hole forming head 50 is lowered again for initial hole forming operation, a movement inhibiting command is given to the lateral feed mechanism 26 of the upper wire guiding unit 28 at the moment when the upper limit switch 70 and dog 74 are disengaged, namely, at the moment when the electric signal generated by the limit switch 70 changes from the ON-signal to the OFF-signal. Accordingly, when the initial hole forming head 50 is lowered to the initial hole forming position (a position at which the dog 74 closes the limit switch 72), the horizontal movement of the upper wire guiding unit 28 is inhibited to avoid the interference between the upper wire guiding unit 28 and the initial hole forming head 50.

As apparent from the foregoing description, according to the present invention, the horizontal movement of the wire guiding means of the wire-cut electrical discharge machine is inhibited until a detection signal is provided upon the detection of the retraction of the initial hole forming head 50 of the initial hole forming device 40 to the resting position. Accordingly, the interference between the initial hole forming head 50 and the wire guiding unit 28 is surely avoided under the control of the NC unit. Naturally, the position detecting means is not limited to that including the upper limit switch 70, the lower limit switch 72 and the dog 74, employed in the first embodiment, but other position detecting means, such as including photoelectric switches or well-known electric reed switches, may alternately be employed.

FIGS. 3 and 4 illustrate an initial hole forming device 40, in a second embodiment according to the present invention. Like reference characters refer to like or corresponding parts or elements throughout FIGS. 1 to 4, hence the description of such parts or elements will be omitted to avoid duplication in the description of the second embodiment.

The significant constitutional difference of the second embodiment from the first embodiment is that the initial hole forming head is moved vertically by a DC motor on the basis of a control command given by a NC unit for further automated operation instead of manually moving the initial hole forming head by applying force to the handle by hand. The functions and effects of the second embodiment are different from those of the first embodiment, and will be described hereinafter.

Now, referring to FIGS. 3 and 4, in the second embodiment, an initial hole forming head 50' is moved vertically relative to a frame unit 42' by a DC motor 80, hence the operating handle 54 and the stop screw 48 with a handle are not provided. The vertical feed means employing the DC motor 80 as a driving source comprises a feed screw mechanism 82 including a feed screw 84 connected to the DC motor 80 and a threaded female portion 86 formed in the backside of the initial hole forming head 50'. The initial hole forming head 50' is guided for vertical sliding motion by a vertical sliding mechanism 88 formed between the initial hole forming head 50' and the frame unit 42'.

The DC motor 80 is electrically connected to an NC unit 22 for vertically moving the initial hole forming head 50' through the feed screw mechanism 82 under the control of the NC unit 22. Detectors (limit switches) 70 and 72 for detecting the arrival of the initial hole forming head 50' at the resting position and at the initial hole forming position are connected, similar to those of the first embodiment, to the NC unit 22.

In the second embodiment, the operation of the initial hole forming head 50' is controlled by the NC unit 22 for controlling the operation of the wire-cut electrical discharge machine in the following manner.

In starting initial hole forming operation from a state where the initial hole forming head 50' is retracted at the resting position, first the NC unit 22 actuates a lateral feed mechanism 26 for horizontally moving an upper wire guiding unit 28 according to a program to return the upper wire guiding unit 28 to the normal operating position. Then, the NC unit 22 gives a drive signal to the DC motor 80 to move the initial hole forming head 50' through the feed screw mechanism 82 vertically downward from the resting position to the initial hole forming position. As the initial hole forming head 50' is moved downward, a dog 74 moves away from the upper limit switch 70 to open the latter. Upon the engagement of the dog 74 with the lower limit switch 72, the lower limit switch 72 provides an electric ON-signal. When the upper limit switch 70 is opened to provide an OFF-signal, the NC unit 22 stops the operation of the wire-cut electrical discharge machine. When the lower limit switch 72 provides an ON-signal, the NC unit 22 gives an operation signal to the initial hole forming device 40 to start supplying discharge power and a machining liquid and to rotate a hollow bar electrode 58. Upon the reception of an initial hole forming command, the NC unit 22 actuates a servomotor 16 of the wire-cut electrical discharge machine to feed the hollow bar electrode 58 vertically through vertical feed means for initial hole forming operation.

Upon the completion of the initial hole forming operation, the NC unit 22 stops the vertical feed means and gives a drive signal to the DC motor 80 to retract the initial hole forming head 50' upward. While the initial hole forming head 50' is retracted from the initial hole forming position to the resting position, the lower limit switch 72 is opened to become OFF, and then the upper limit switch 70 is closed to provide an electric ON-signal. Accordingly, the NC unit 22 stops the operation of the initial hole forming device 40 when the lower limit switch 72 is opened, and then cancels the inhibition of operation of the lateral feed mechanism 26 for moving the upper wire guiding unit 28 when the upper limit switch 70 provides an electric ON-signal. Then, the wire electrode 30 is inserted through the initial hole formed in the workpiece W to start the wire-cut electrical discharge machining of the workpiece W.

As apparent from the foregoing description, in the second embodiment of the present invention, since the initial hole forming head 50' of the initial hole forming device 40 is moved vertically by the DC motor 80, further automation of the initial hole forming operation is achieved and the interference between the upper wire guiding unit and the initial hole forming device 40 is avoided by controlling the operation of the initial hole forming device 40 and the wire-cut electrical discharge machine on the basis of the electric signals provided by the detecting means for detecting the arrival of the initial hole forming head 50' at the initial hole forming position and at the resting position. Accordingly, the initial hole forming device 40 disposed adjacent to the upper wire guiding unit is able to function effectively. Although the second embodiment employs limit switches as the detecting means, the limit switches may be substituted by electromagnetic switches or photoelectric switches.

According to the technical concept of the present invention, a servomotor may be employed instead of the DC motor for vertically moving the initial hole forming head. When a servomotor is employed, the built-in rotary detector of the servomotor is used for setting the resting position and the initial hole forming position of the initial hole forming head, and thereby further highly automated control of the initial hole forming operation and the sequential operation of the wire-cut electrical discharge machine and the initial hole forming device are achieved under the control of the NC unit.

We claim:

1. A wire electrode electrical discharge machine including an initial hole forming device comprising:
    an electrical discharge machine having wire guiding means for guiding a wire electrode, said machine including vertical feed means for vertically moving the wire guiding means toward and away from a workpiece and a lateral feed mechanism supported on said vertical feed means for laterally moving said wire guiding means;

frame means attached to said vertical feed means to be vertically moved thereby;

an initial hole forming head attached to the frame means so as to be vertically slidable relative to the frame means, said initial hole forming head being provided at the lower end thereof with a rotary chuck for holding a hollow bar electrode;

operating means for vertically shifting said initial hole forming head on said frame means between a first initial hole forming position near said wire guiding means and a second resting position to which said initial hole forming head is retracted upward from said first initial hole forming position;

position detecting means on said frame means for detecting positions of said initial hole forming head and providing detection signals indicating positioning of said initial hole forming head and each of said first and second positions; and control means responsive to said detection signals and operative to inhibit operation of said lateral feed mechanism of said wire guiding means while a detection signal provided by said position detecting means indicates that said initial hole forming head is positioned at said first position, and to permit operation of said lateral feed mechanism of said wire guiding means when a detection signal indicates that said initial hole forming head is positioned at said second position.

2. A wire electrode electrical discharge machine as recited in claim 1 wherein said operating means for vertically shifting said initial hole forming head comprises a handle provided on said initial hole forming head for vertically moving said head, and said initial hole forming head further includes a stop screw for fastening said initial hole forming head to said frame means.

3. A wire electrode electrical discharge machine as recited in claim 1 wherein said operating means for vertically shifting said initial hole forming head includes a feed motor for vertically moving said initial hole forming head.

4. A wire electrode electrical discharge machine as recited in claim 2 or claim 3, wherein said position detecting means comprises a switch actuating dog provided on said initial hole forming head and electrical switches disposed on said frame means so as to cooperate with said switch actuating dog.

5. A wire electrode electrical discharge machine as recited in claim 1, wherein said initial hole forming head is disposed near said wire guiding means disposed above said workpiece.

6. A wire electrode electrical discharge machine as recited in claim 1, wherein said vertical feed means and lateral feed mechanism of said wire guiding means are connected to a numerical control unit to be controlled thereby, the operation of said numerical control unit being responsive to said detection signals.

7. A wire electrode electrical discharge machine as recited in claim 3, wherein said vertical feed means and lateral feed mechanism of said wire guiding means and said feed motor for moving said initial hole forming head are connected to a numerical control unit to be controlled thereby, the operation of said numerical control unit being responsive to said detection signals.

* * * * *